(12) United States Patent
Sabne et al.

(10) Patent No.: US 12,651,211 B2
(45) Date of Patent: Jun. 9, 2026

(54) SYSTEM AND METHOD FOR EFFICIENTLY TRAINING A MACHINE LEARNING MODEL WITH OPTIMIZED NUMBER OF DATA ELEMENTS FOR PREDICTING TRAVEL INTENT

(71) Applicant: AIRLINES REPORTING CORPORATION, Arlington, VA (US)

(72) Inventors: Shitalkumar Sarangdharrao Sabne, Aldie, VA (US); Steven Botham, Plant City, FL (US); Nicholas Alexander Gare, Brandon, FL (US)

(73) Assignee: AIRLINES REPORTING CORPORATION, Arlington, VA (US)

( * ) Notice: Subject to any disclaimer, the term of this patent is extended or adjusted under 35 U.S.C. 154(b) by 171 days.

(21) Appl. No.: 18/407,896

(22) Filed: Jan. 9, 2024

(65) Prior Publication Data

US 2025/0225446 A1    Jul. 10, 2025

(51) Int. Cl.
*G06Q 10/02* (2012.01)

(52) U.S. Cl.
CPC .................................... *G06Q 10/02* (2013.01)

(58) Field of Classification Search
CPC ..................................................... G06Q 10/02
See application file for complete search history.

(56) References Cited

U.S. PATENT DOCUMENTS

| | | | | |
|---|---|---|---|---|
| 11,429,881 B1 * | 8/2022 | Wu | ......................... | G06F 16/248 |
| 2019/0095785 A1 * | 3/2019 | Sarkar | ..................... | G06N 20/00 |
| 2020/0065384 A1 * | 2/2020 | Costello | .................... | G06N 3/04 |
| 2023/0153703 A1 * | 5/2023 | Natarajan | .......... | G06Q 30/0205 |
| | | | | 705/5 |
| 2023/0259813 A1 * | 8/2023 | Chang | .................. | G06N 3/0464 |
| | | | | 706/12 |

FOREIGN PATENT DOCUMENTS

| | | | | | |
|---|---|---|---|---|---|
| WO | WO-2022246378 A1 * | 11/2022 | ............... | G06N 5/01 |
| WO | WO-2023044484 A1 * | 3/2023 | ............. | G06Q 10/02 |

OTHER PUBLICATIONS

Eyden Samunderu and Michael Farrugia, "Predicting customer purpose of travel in a low-cost travel environment—A Machine Learning Approach," Machine Learning with Applications, vol. 9, Jul. 7, 2022 (https://www.sciencedirect.com/science/article/pii/S2666827022000676). (Year: 2022).*

* cited by examiner

*Primary Examiner* — Jeff Zimmerman
*Assistant Examiner* — Hunter Molnar
(74) *Attorney, Agent, or Firm* — Kaufman & Canoles, P.C.

(57) ABSTRACT

A method and system for performing a prediction of a travel intent of a trip are disclosed. The method includes receiving sets of ticket attribute information, identifying a set of data elements, parsing at least one data element, identifying a pattern among a select portion of the parsed at least one data element and setting the respective portion as a data element, performing hyper parameter tuning to reduce a number of data elements to be included in a training dataset among the data elements, and iteratively training a machine learning model to the training dataset and evaluating accuracy of output provided by the trained machine learning model with respect to a reference threshold predicting whether a trip is a business type or a leisure type based on ticket attribute information associated with the trip.

20 Claims, 11 Drawing Sheets

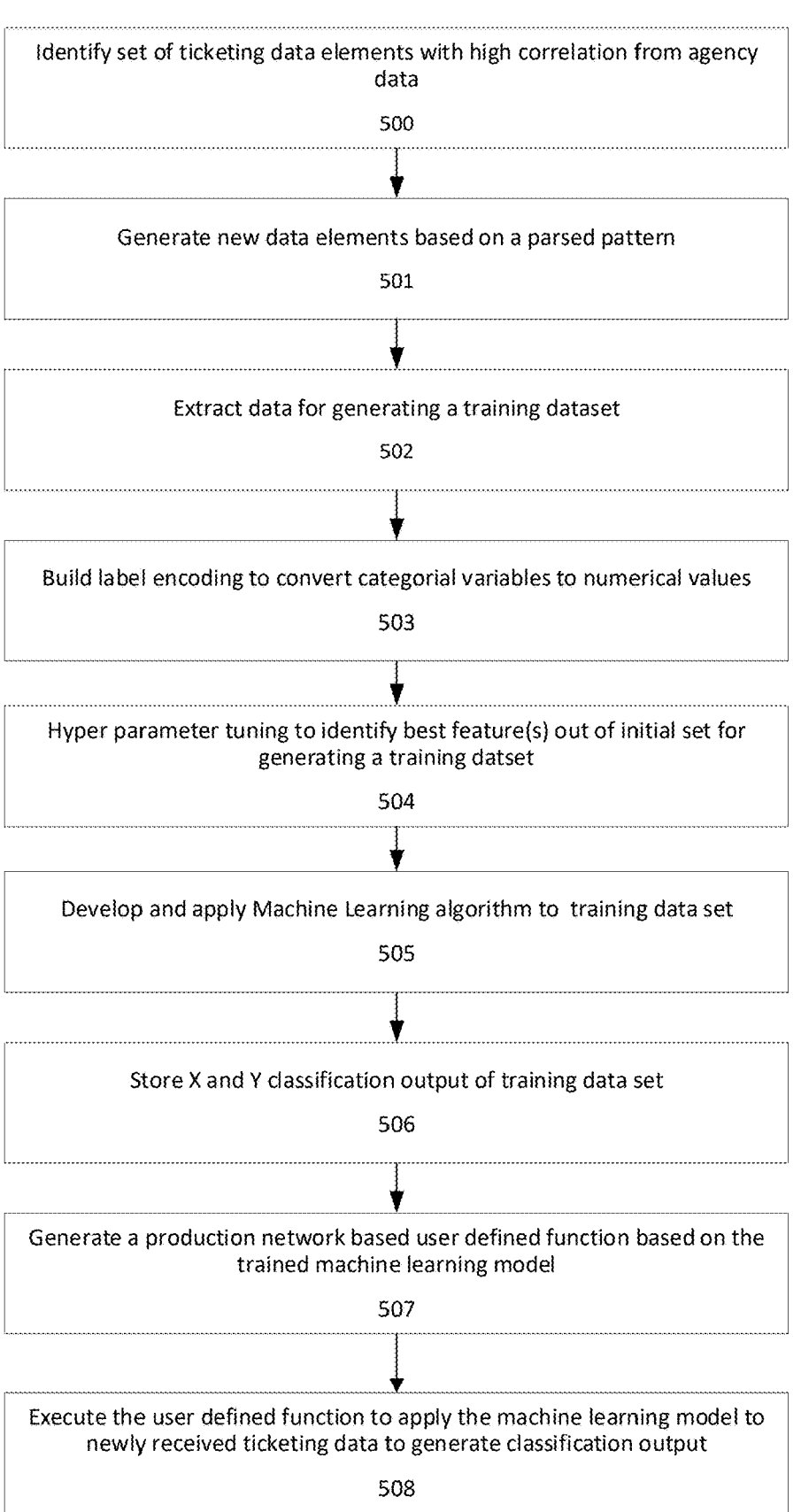

Identify set of ticketing data elements with high correlation from agency data

500

Generate new data elements based on a parsed pattern

501

Extract data for generating a training dataset

502

Build label encoding to convert categorial variables to numerical values

503

Hyper parameter tuning to identify best feature(s) out of initial set for generating a training datset

504

Develop and apply Machine Learning algorithm to training data set

505

Store X and Y classification output of training data set

506

Generate a production network based user defined function based on the trained machine learning model

507

Execute the user defined function to apply the machine learning model to newly received ticketing data to generate classification output

```
CASE WHEN DOMNT_CABIN_CLASS_CD='A0' Then 1
     WHEN DOMNT_CABIN_CLASS_CD='C' Then 2
     WHEN DOMNT_CABIN_CLASS_CD='DY' Then 3
     WHEN DOMNT_CABIN_CLASS_CD='F' Then 4
     WHEN DOMNT_CABIN_CLASS_CD='J' Then 5
     WHEN DOMNT_CABIN_CLASS_CD='R' Then 6
     WHEN DOMNT_CABIN_CLASS_CD='W' Then 7
     WHEN DOMNT_CABIN_CLASS_CD='Y' Then 8
```

FIG. 6B

| TKT | ADV | C. | D. | S. | I. | TC | LOS | B/L |
|---|---|---|---|---|---|---|---|---|
| 1915500000000016263 | 3 | 8 | 1 | 0 | 1 | 0 | 3 | 0 |
| 1915500000000016265 | 3 | 8 | 4 | 0 | 1 | 0 | 0 | 0 |
| 1915500000000016280 | 0 | 8 | 1 | 0 | 1 | 0 | 0 | 0 |
| 1915500000000016282 | 3 | 3 | 2 | 0 | 1 | 0 | 0 | 0 |
| 1915500000000016290 | 3 | 8 | 3 | 0 | 1 | 0 | 0 | 0 |

FIG. 6C

TARGET DATA

| B/L |
|-----|
| 0 |
| 0 |
| 1 |
| 0 |
| 0 |

FEATURE DATA

| ADV | C | D | S | I | T | C |
|-----|---|---|---|---|---|---|
| 3 | 8 | 1 | 0 | 1 | 0 | 3 |
| 3 | 8 | 4 | 0 | 1 | 0 | 0 |
| 0 | 8 | 1 | 0 | 1 | 0 | 0 |
| 3 | 3 | 2 | 0 | 1 | 0 | 0 |
| 3 | 8 | 3 | 0 | 1 | 0 | 0 |

FIG. 7

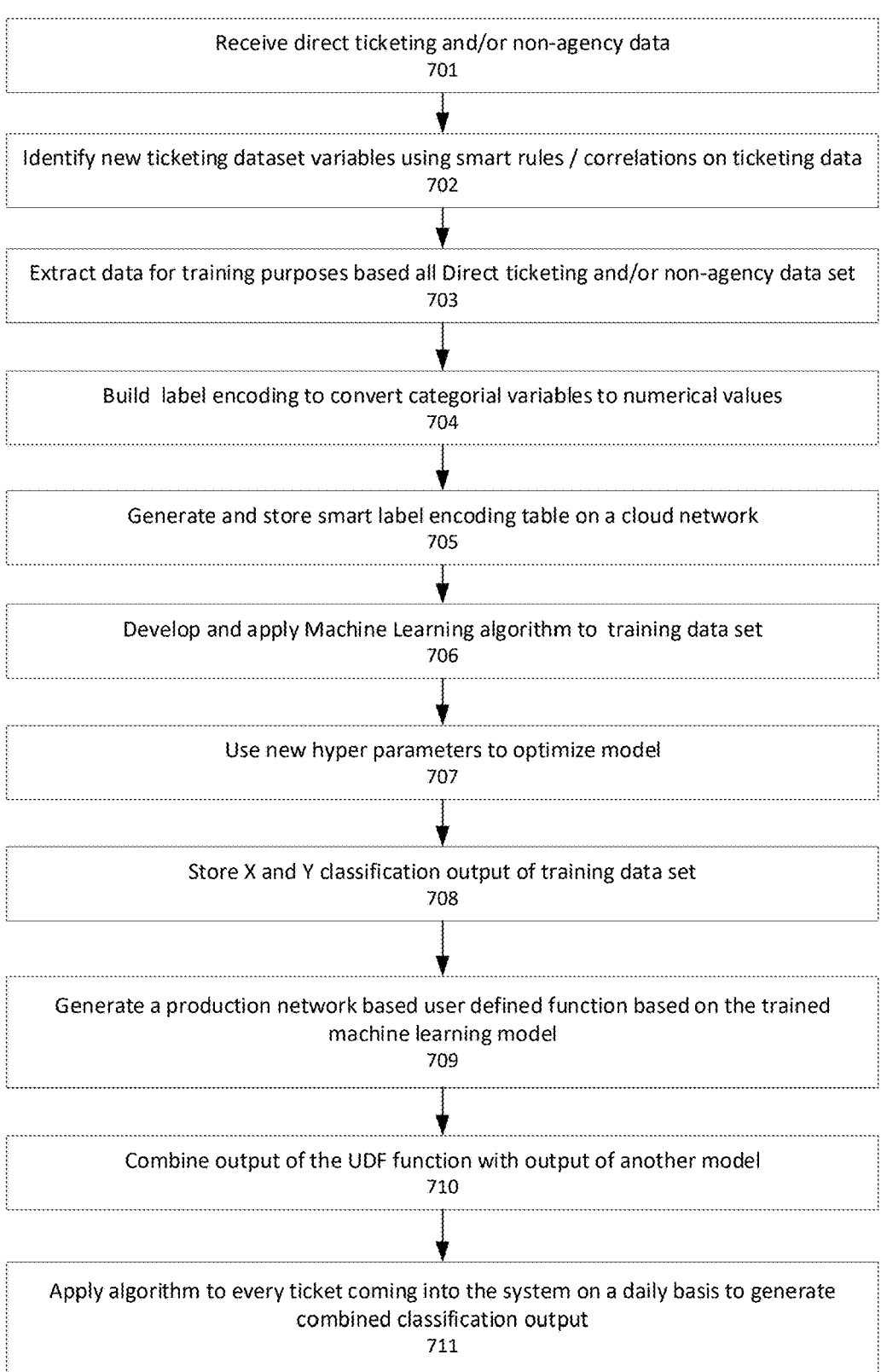

Receive direct ticketing and/or non-agency data
701

Identify new ticketing dataset variables using smart rules / correlations on ticketing data
702

Extract data for training purposes based all Direct ticketing and/or non-agency data set
703

Build label encoding to convert categorial variables to numerical values
704

Generate and store smart label encoding table on a cloud network
705

Develop and apply Machine Learning algorithm to training data set
706

Use new hyper parameters to optimize model
707

Store X and Y classification output of training data set
708

Generate a production network based user defined function based on the trained machine learning model
709

Combine output of the UDF function with output of another model
710

Apply algorithm to every ticket coming into the system on a daily basis to generate combined classification output
711

FIG. 8

| | TKT_ID | CARR | OND_ARPTS | ADV | CLS | DEPT_DAY | SAT_STAY | INT_IND | TOUR_CD | LOS | FARE_CID | GDS | AGTN | TRIP_TYPE_CD | BL_IND |
|---|---|---|---|---|---|---|---|---|---|---|---|---|---|---|---|
| TKT_ID | 1 | Value | Value | Value | Value | Value | Value | Value | Value | Value | Value | Value | Value | Value | Value |
| CARR | Value | 1 | Value | Value | Value | Value | Value | Value | Value | Value | Value | Value | Value | Value | Value |
| OND_ARPTS | Value | Value | 1 | Value | Value | Value | Value | Value | Value | Value | Value | Value | Value | Value | Value |
| ADV | Value | Value | Value | 1 | Value | Value | Value | Value | Value | Value | Value | Value | Value | Value | Value |
| CLS | Value | Value | Value | Value | 1 | Value | Value | Value | Value | Value | Value | Value | Value | Value | Value |
| DEPT_DAY | Value | Value | Value | Value | Value | 1 | Value | Value | Value | Value | Value | Value | Value | Value | Value |
| SAT_STAY | Value | Value | Value | Value | Value | Value | 1 | Value | Value | Value | Value | Value | Value | Value | Value |
| INT_IND | Value | Value | Value | Value | Value | Value | Value | 1 | Value | Value | Value | Value | Value | Value | Value |
| TOUR_CD | Value | Value | Value | Value | Value | Value | Value | Value | 1 | Value | Value | Value | Value | Value | Value |
| LOS | Value | Value | Value | Value | Value | Value | Value | Value | Value | 1 | Value | Value | Value | Value | Value |
| FARE_CID | Value | Value | Value | Value | Value | Value | Value | Value | Value | Value | 1 | Value | Value | Value | Value |
| GDS | Value | Value | Value | Value | Value | Value | Value | Value | Value | Value | Value | 1 | Value | Value | Value |
| AGTN | Value | Value | Value | Value | Value | Value | Value | Value | Value | Value | Value | Value | 1 | Value | Value |
| RIP_TYPE_CD | Value | Value | Value | Value | Value | Value | Value | Value | Value | Value | Value | Value | Value | 1 | Value |
| BL_IND | Value | Value | Value | Value | Value | Value | Value | Value | Value | Value | Value | Value | Value | Value | 1 |

SYSTEM AND METHOD FOR EFFICIENTLY TRAINING A MACHINE LEARNING MODEL WITH OPTIMIZED NUMBER OF DATA ELEMENTS FOR PREDICTING TRAVEL INTENT

TECHNICAL FIELD

This disclosure generally relates to estimating an intent of travel by a passenger. More specifically, the present disclosure generally relates to providing insights into passenger behavior and intent of travel based on various ticket attributes.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Conventionally, trip bookings were predominantly performed through a travel agency, especially for business travel. Accordingly, it was relatively easy to distinguish business travelers from leisure travelers. Recently, however, more and more business travelers are booking their trips directly through service providers or online travel agencies, similar to leisure travelers. Based on changing booking practices, travel organizations are no longer able to discern business travelers from leisure travelers based on booking data alone, thus limiting further data processing that relies on such categorization.

SUMMARY

According to an aspect of the present disclosure, a method for performing a prediction of a travel intent of a trip is provided. The method includes receiving, by a processor, a plurality of sets of ticket attribute information from a plurality of sources, the plurality of sources including at least one first source type and at least one second source type: determining, by the processor, whether the ticket attribute information is received from the at least one first source type or the at least one second source type: in response to determining that a first set of ticket attribute information is included among the plurality of sets of ticket attribute information based on the determined source type, identifying a first set of data elements included in the first set of ticket attribute information for training a first machine learning model: in response to determining that a second set of ticket attribute information is included among the plurality of sets of ticket attribute information based on the determined source type, identifying a second set of data elements included in the first set of ticket attribute information for training a second machine learning model: parsing at least one data element included in the first set of ticket attribute information, wherein the at least one data element is absent from the first set of data elements, identifying a pattern among a select portion of the parsed at least one data element, and setting the select portion of the parsed at least one data element as a data element to be added to the first set of data elements to provide a modified first set of data elements: extracting, by the processor and from a server, data corresponding for the modified first set of data elements and the second set of data elements: performing, by the processor, hyper parameter tuning to reduce a number of data elements to be included in a training dataset among each of the modified first set of data elements and the second set of data elements: iteratively training, by the processor, at least one of the first machine learning model and second machine learning model to the training dataset and evaluating accuracy of output provided by the trained at least one of the first machine learning model and second machine learning model with respect to a reference threshold: generating, by the processor and on a cloud network, a user defined function for processing a new set of ticket attribute information through the trained at least one of the first machine learning model and second machine learning model; and executing, by the processor, the user defined function to apply the trained at least one of the first machine learning model and second machine learning model on the new set of ticket attribute information and providing a prediction of whether each trip included in the new set of ticket attribute information is a business type or a leisure type.

According to another aspect of the present disclosure, the second set of data elements includes one or more data elements absent in the first set of ticket attribute information.

According to another aspect of the present disclosure, at least one data element of the modified first set of data elements and the second set of data elements includes a plurality of categorical values.

According to yet another aspect of the present disclosure, at least one data element of the modified first set of data elements and the second set of data elements includes a binary indicator.

According to another aspect of the present disclosure, at least one data element of the modified first set of data elements and the second set of data elements includes a discrete numerical value.

According to a further aspect of the present disclosure, the method further includes building, by the processor, label encoding to convert categorical variables of a data element to numeric values.

According to yet another aspect of the present disclosure, a number of data elements included in the training dataset is less than a number of data elements included in the modified first set of data elements and the second set of data elements.

According to a further aspect of the present disclosure, the machine learning algorithm is a decision tree.

According to another aspect of the present disclosure, the machine learning algorithm is a random forest that successively generates a plurality of trees.

According to a further aspect of the present disclosure, outputs of the plurality of trees are combined to provide a single result.

According to a further aspect of the present disclosure, each of the data element included in the training set has a correspondence level above a reference value with respect to a target output.

According to a further aspect of the present disclosure, the method further includes modifying at least one attribute of a data element included in the training dataset.

According to a further aspect of the present disclosure, the modifying the at least one attribute of the data element includes modifying a number of categories corresponding to a data element included in the training dataset.

According to a further aspect of the present disclosure, the modifying the at least one attribute of the data element includes modifying discrete values to a set of ranges.

According to a further aspect of the present disclosure, the plurality of sets of ticket attribute information includes a set of agency provided data and a set of direct ticketing data.

According to a further aspect of the present disclosure, the hyper parameter tuning selects smallest number of data elements that provides an accuracy level that is greater than or equal to the reference threshold.

According to a further aspect of the present disclosure, the method further includes generating a label encoding table corresponding to the second set of data elements.

According to a further aspect of the present disclosure, the reference threshold is a fixed value or a variable value that corresponds to highest accuracy level achieved by a previous machine learning model.

According to an aspect of the present disclosure, a system for performing a prediction of a travel intent of a trip is provided. The system includes a memory, a display and a processor. The system is configured to perform: receiving a plurality of sets of ticket attribute information from a plurality of sources, the plurality of sources including at least one first source type and at least one second source type: determining whether the ticket attribute information is received from the at least one first source type or the at least one second source type: in response to determining that a first set of ticket attribute information is included among the plurality of sets of ticket attribute information based on the determined source type, identifying a first set of data elements included in the first set of ticket attribute information for training a first machine learning model: in response to determining that a second set of ticket attribute information is included among the plurality of sets of ticket attribute information based on the determined source type, identifying a second set of data elements included in the first set of ticket attribute information for training a second machine learning model: parsing at least one data element included in the first set of ticket attribute information, wherein the at least one data element is absent from the first set of data elements, identifying a pattern among a select portion of the parsed at least one data element, and setting the select portion of the parsed at least one data element as a data element to be added to the first set of data elements to provide a modified first set of data elements: extracting, from a server, data corresponding for the modified first set of data elements and the second set of data elements: performing hyper parameter tuning to reduce a number of data elements to be included in a training dataset among each of the modified first set of data elements and the second set of data elements: iteratively training at least one of the first machine learning model and second machine learning model to the training dataset and evaluating accuracy of output provided by the trained at least one of the first machine learning model and second machine learning model with respect to a reference threshold: generating, on a cloud network, a user defined function for processing a new set of ticket attribute information through the trained at least one of the first machine learning model and second machine learning model; and executing the user defined function to apply the trained at least one of the first machine learning model and second machine learning model on the new set of ticket attribute information and providing a prediction of whether each trip included in the new set of ticket attribute information is a business type or a leisure type.

According to another aspect of the present disclosure, a non-transitory computer readable storage medium that stores a computer program for performing a prediction of a travel intent of a trip is provided. The computer program, when executed by a processor, causes a system to perform multiple processes including: receiving a plurality of sets of ticket attribute information from a plurality of sources, the plurality of sources including at least one first source type and at least one second source type: determining whether the ticket attribute information is received from the at least one first source type or the at least one second source type: in response to determining that a first set of ticket attribute information is included among the plurality of sets of ticket attribute information based on the determined source type, identifying a first set of data elements included in the first set of ticket attribute information for training a first machine learning model: in response to determining that a second set of ticket attribute information is included among the plurality of sets of ticket attribute information based on the determined source type, identifying a second set of data elements included in the first set of ticket attribute information for training a second machine learning model: parsing at least one data element included in the first set of ticket attribute information, wherein the at least one data element is absent from the first set of data elements, identifying a pattern among a select portion of the parsed at least one data element, and setting the select portion of the parsed at least one data element as a data element to be added to the first set of data elements to provide a modified first set of data elements: extracting, from a server, data corresponding for the modified first set of data elements and the second set of data elements: performing hyper parameter tuning to reduce a number of data elements to be included in a training dataset among each of the modified first set of data elements and the second set of data elements: iteratively training at least one of the first machine learning model and second machine learning model to the training dataset and evaluating accuracy of output provided by the trained at least one of the first machine learning model and second machine learning model with respect to a reference threshold; generating, on a cloud network, a user defined function for processing a new set of ticket attribute information through the trained at least one of the first machine learning model and second machine learning model; and executing the user defined function to apply the trained at least one of the first machine learning model and second machine learning model on the new set of ticket attribute information and providing a prediction of whether each trip included in the new set of ticket attribute information is a business type or a leisure type.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 illustrates a method for providing a machine learning model for predicting a travel intent using agency provided data in accordance with an exemplary embodiment.

FIGS. 6A-6C illustrate various processing performed on raw data of select data elements for generating a training dataset in accordance with an exemplary embodiment.

FIG. 7 illustrates a method for providing a machine learning model for predicting a travel intent using direct booking data in accordance with an exemplary embodiment.

FIG. 8 illustrates a smart label encoding table in accordance with an exemplary embodiment.

DETAILED DESCRIPTION

Figure 1:
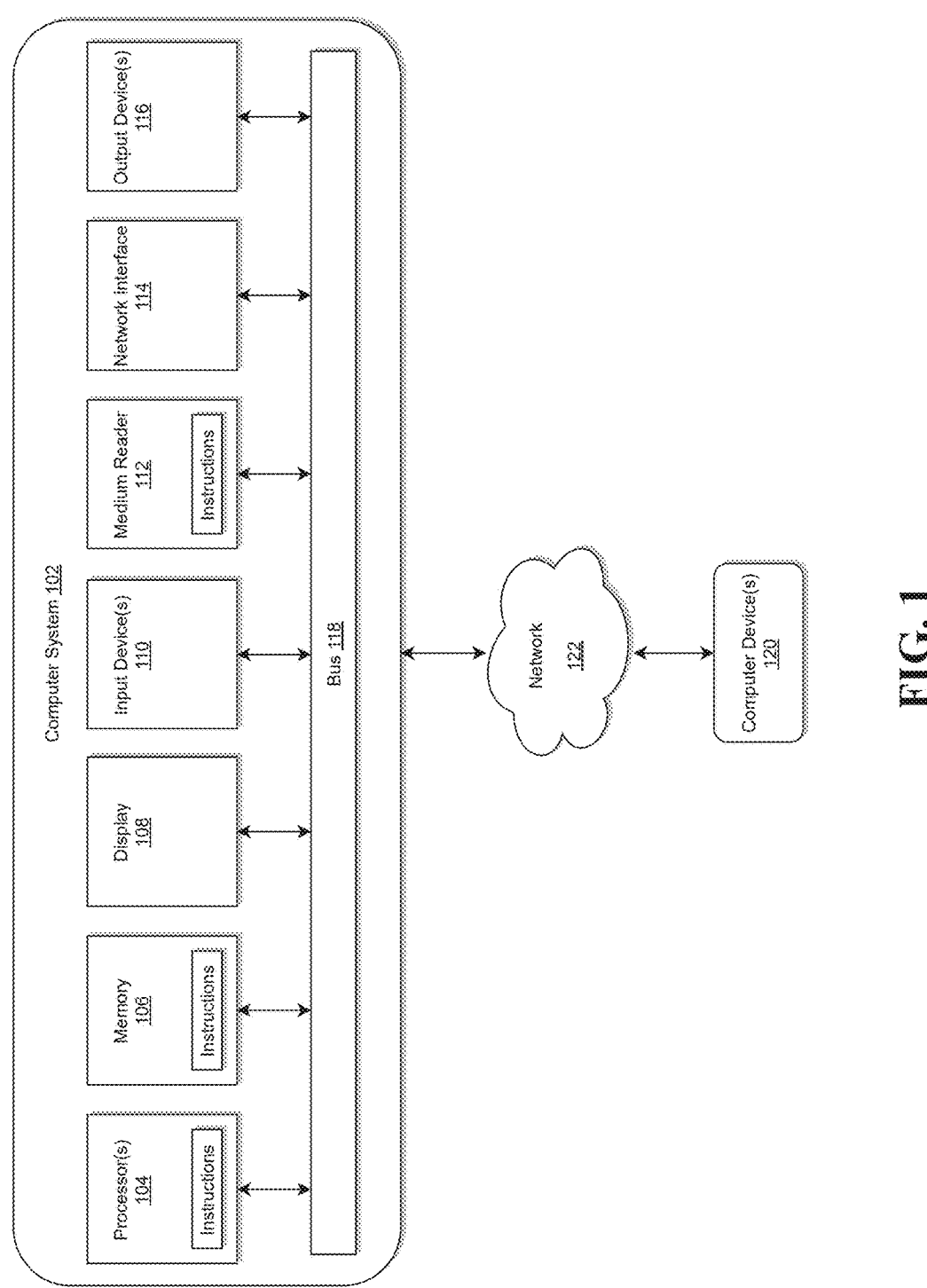
FIG. 1 illustrates a computer system for implementing a trip classification system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a trip classification system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time.

The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
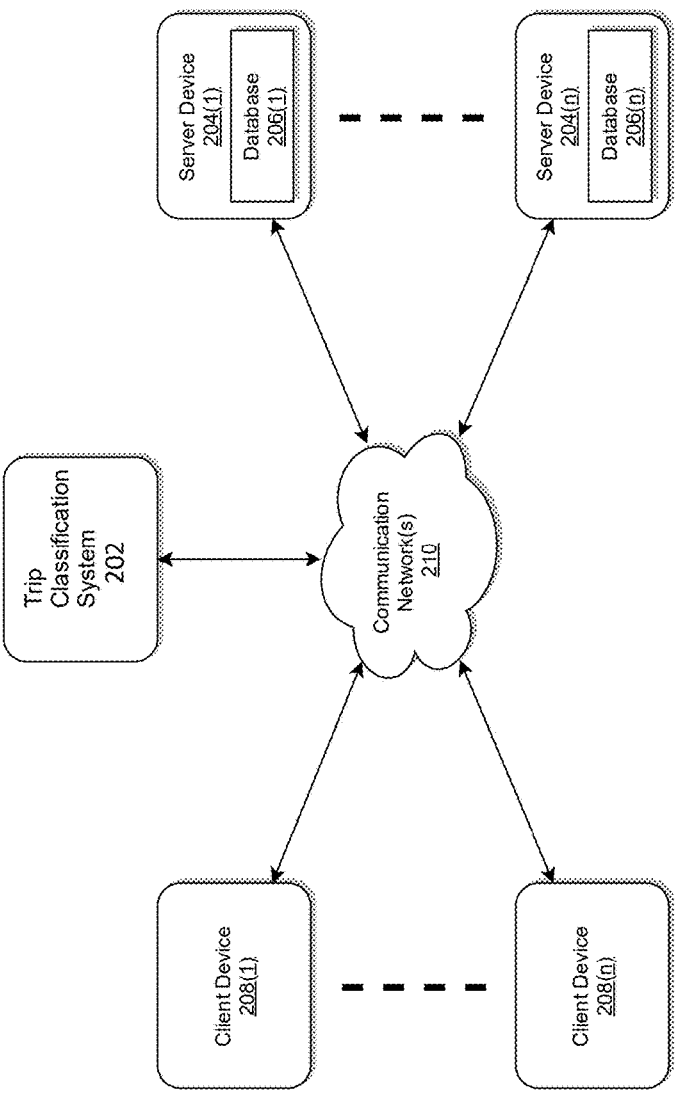
FIG. 2 illustrates an exemplary diagram of a network environment with a trip classification system in accordance with an exemplary embodiment.

FIG. 2 illustrates an exemplary diagram of a network environment with a trip classification system in accordance with an exemplary embodiment.

A trip classification system (TCS) 202 may be implemented with one or more computer systems similar to the computer system 102 as described with respect to FIG. 1.

The trip classification system 202 may store one or more applications that can include executable instructions that, when executed by the trip classification system 202, cause the trip classification system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the trip classification system 202 itself, may be located in virtual server(s) running in a cloud-based computing environment rather than being tied to one or more specific physical network computing devices. Also, the application(s) may be running in one or more virtual machines (VMs) executing on the trip classification system 202. Additionally, in one or more embodiments of this technology, virtual machine(s) running on the trip classification system 202 may be managed or supervised by a hypervisor.

In the network environment 200 of FIG. 2, the trip classification system 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the trip classification system 202, such as the network interface 114 of the computer system 102 of FIG. 1, operatively couples and communicates between the trip classification system 202, the server devices 204(1)-204(n), and/or the client devices 208(1)-208 (n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the trip classification system 202, the server devices 204(1)-204(n), and/or the client devices 208(1)-208 (n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The trip classification system 202 may be a standalone device or integrated with one or more other devices or apparatuses, such as one or more of the server devices 204(1)-204(n), for example. In one particular example, the trip classification system 202 may be hosted by one of the server devices 204(1)-204(n), and other arrangements are also possible. Moreover, one or more of the devices of the trip classification system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the trip classification system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206 (n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the trip classification system 202 that may efficiently provide a platform for implementing a cloud native trip classification system module, but the disclosure is not limited thereto.

The client devices 208(1)-208(n) may run interface applications, such as standard web browsers or standalone client applications, which may provide an interface to communicate with the trip classification system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the trip classification system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the trip classification system 202, the server devices 204(1)-204(n), or the client devices 208(1)-208(n), for example, may be configured to operate as virtual instances on the same physical machine. For example, one or more of the trip classification system 202, the server devices 204(1)-204(n), or the client devices 208(1)-208(n) may operate on the same physical device rather than as separate devices communicating through communication network(s) 210. Additionally, there may be more or fewer trip classification systems 202, server devices 204(1)-204(n), or client devices 208(1)-208(n) than illustrated in FIG. 2. According to exemplary embodiments, the trip classification system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
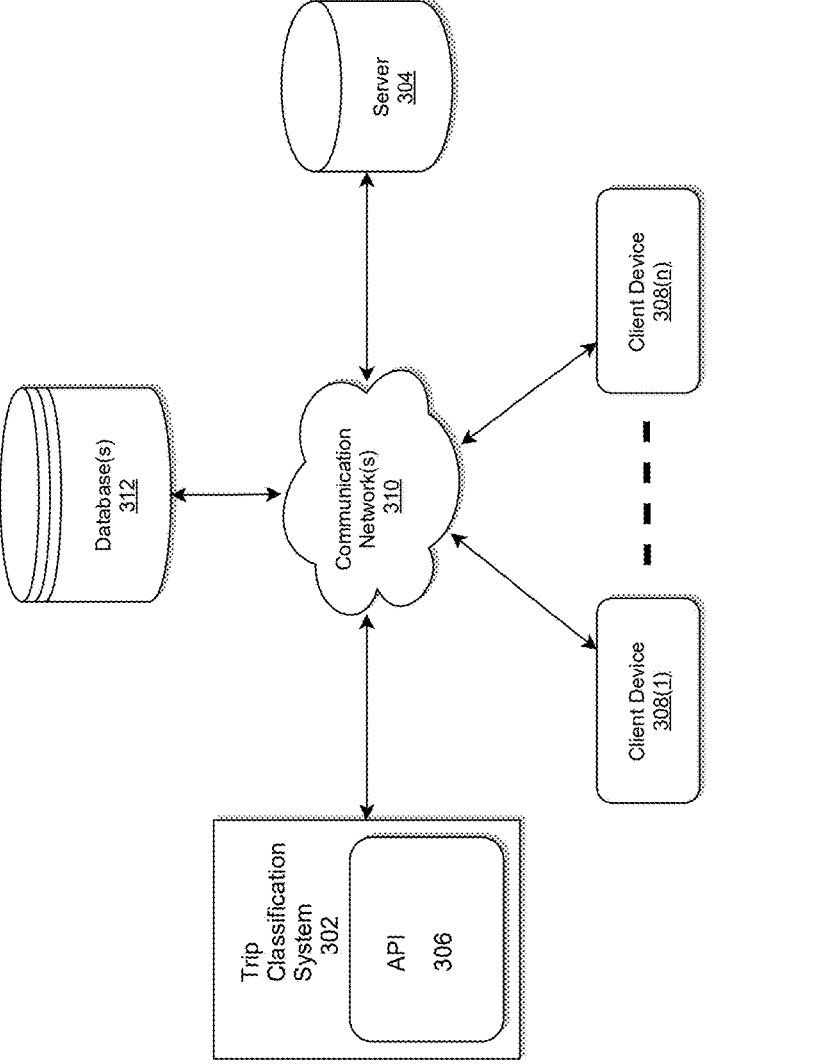
FIG. 3 illustrates a system diagram for implementing a trip classification system in accordance with an exemplary embodiment.

FIG. 3 illustrates a system diagram for implementing a trip classification system in accordance with an exemplary embodiment.

As illustrated in FIG. 3, the system 300 may include a trip classification system 302 within which a group of API modules 306 is embedded, a server 304, a database(s) 312, a plurality of client devices 308(1) . . . 308(n), and a communication network 310.

According to exemplary embodiments, the trip classification system 302 including the API modules 306 may be connected to the server 304, and the database(s) 312 via the communication network 310. Although there is only one database that has been illustrated, the disclosure is not limited thereto. Any number of databases may be utilized. The trip classification system 302 may also be connected to the plurality of client devices 308(1) . . . 308(n) via the communication network 310, but the disclosure is not limited thereto.

According to exemplary embodiment, the trip classification system 302 is described and shown in FIG. 3 as including the API modules 306, although it may include other rules, policies, modules, databases, or applications, for example. According to exemplary embodiments, the database(s) 312 may be embedded within the trip classification system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable trip classification system as a service for a desired data processing scheme. The UI platform may include an input interface layer and an output interface layer. The input interface layer may request preset input fields to be provided by a user in accordance with a selection of an automation template. The UI platform may receive user input via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the trip classification system 302. In this regard, the plurality of client devices 308(1) . . . 308(n) may be "clients" of the trip classification system 302 and are described herein as such. Nevertheless, it is to be known and understood that the plurality of client devices 308(1) . . . 308(n) need not necessarily be "clients" of the trip classification system 302, or any entity described in association therewith herein. Any additional or alternative relationship may exist between either or both of the plurality of client devices 308(1) . . . 308(n) and the trip classification system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the trip classification system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The trip classification system 302 may be the same or similar to the trip classification system 202 as described with respect to FIG. 2, including any features or combination of features described with respect thereto.

Figure 4:
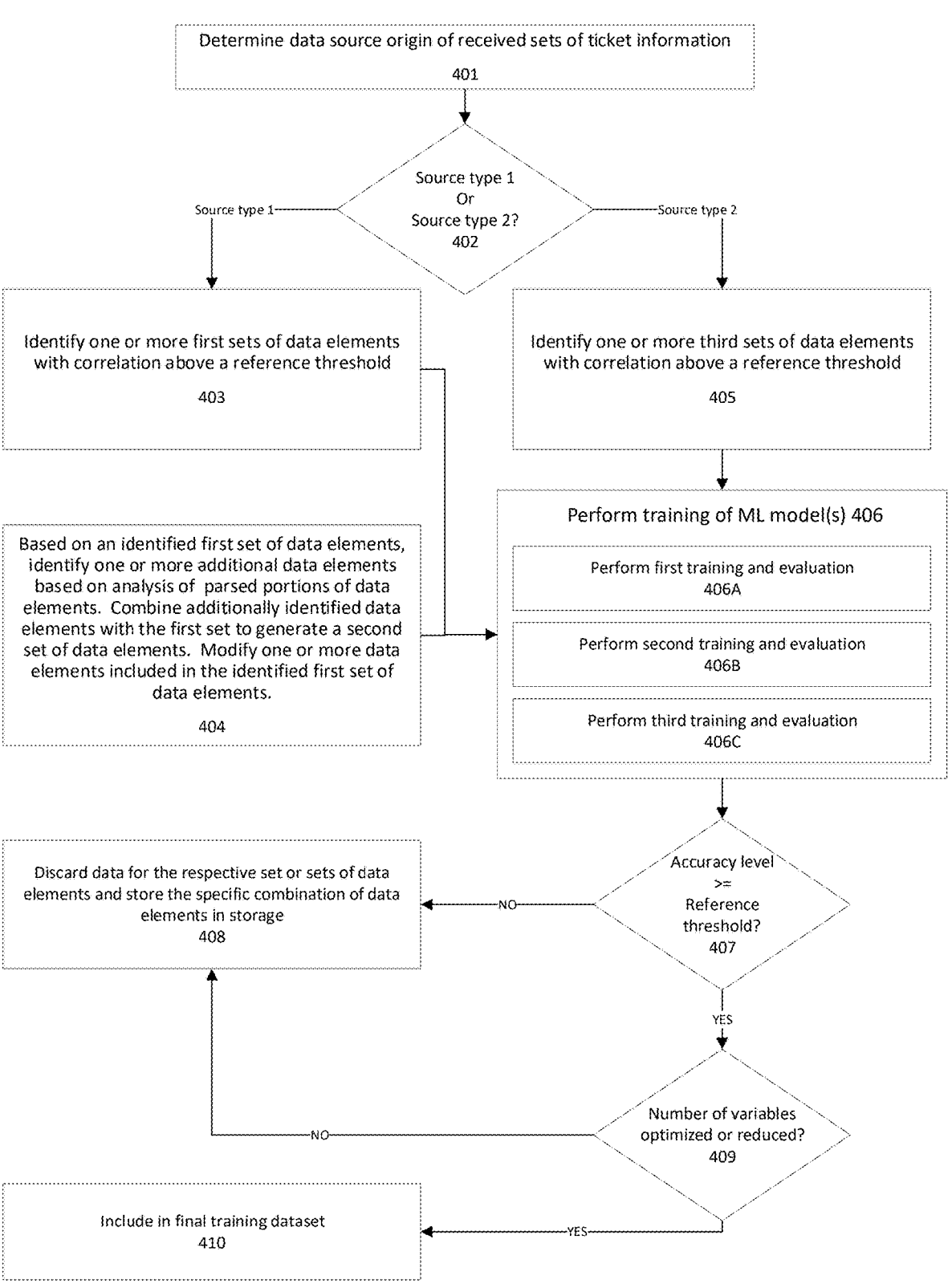
FIG. 4 illustrates a method for generating optimized sets of training data elements for more efficiently training a machine learning model in accordance with an exemplary embodiment.

FIG. 4 illustrates a method for generating optimized sets of training data elements for more efficiently training a machine learning model in accordance with an exemplary embodiment.

According to exemplary aspects of the present disclosure, a trip classification system may include a trip classification indicator (TCI), which may provide insights into passenger behavior and the passenger's intent for travel. Although exemplary embodiments of the present disclosure are described with respect to air travel, aspects of the present disclosure are not limited thereto, such that the present disclosure may be applicable to different modes of travel, such as by travel by water, roads, train tracks and/or in a combination thereof.

According to exemplary aspects, the trip classification indicator may include one or more models, which may be built and trained using machine learning algorithms and unique sets of one or more of ticket attributes or trip information that may correspond with one another above a reference threshold. However, aspects of the present disclosure are not limited thereto, such that the one or models may include models built using other forms of artificial intelligence, including but not limited to, neural networks, decision tree, logistic regression, deep learning, generative artificial intelligence, and the like.

In operation 401, a determination of data source origin is determined for sets of ticket information or ticket attribute information that includes a number of data elements and variables. According to exemplary aspects, different data source origins may provide differing sets of data elements or variables for each trip or ticket information. According to exemplary aspects, data source origin may include two or more types of data, which may include travel agency source type, direct booking source type, and the like. In an example, the travel agency source type may include corporate travel departments within an organization, which may explicitly or implicitly indicate that the booked trips are for corporate travel or business related travel. On the other hand, the direct booking source type may include trips that were booked directly by an individual passenger, and may not directly indicate whether the individual passenger booked a trip for business or leisure. According to exemplary aspects, data elements or variables included from the direct booking source type and the travel agency source type may include one or more same or similar elements, and/or include differing data elements. For example, there may be certain data elements or variables that may be present in the direct booking source type that may be unavailable in the travel agency source type. Similarly, there may be certain data elements or variables that may be present in the travel agency source type that may be unavailable in the direct booking source type.

Although terminology of leisure is utilized to distinguish from business or corporate travel, aspects of the present disclosure are not limited thereto, such that a leisure trip may include personal travel, including travelling for weddings, reunions, family gatherings, funerals and the like.

In operation 402, a determination is made as to whether the data source origin is a source type 1 or source type 2. According to exemplary aspects, the source type 1 and the source type 2 may include different combination of data elements. Although two source types are indicated, aspects of the present disclosure are not limited thereto, such that more source types may be included. In an example, the source type 1 may include a travel agency source type, and the source type 2 may include direct booking source type and/or non-agency source type.

If the data source origin is determined to be source type 1 in operation 402, then the method proceeds to operation 403. In operation 403, one or more first sets of data elements with a correlation level above a first reference threshold are identified. In an example, each of the first sets of data elements or variables may include different combinations of data elements or variables. More detailed descriptions of operation 403 may be provided in the descriptions of FIGS. 5 and 6A-6C provided below.

According to exemplary aspects, only data elements having correlation level above the first reference threshold may be included in a first set to limit the number of data elements or variables included in each set. At least since larger number of data elements included in training data increases amount of computing resources (e.g., processor, memory, and network bandwidth) that are utilized during training as well as execution of a completed model, limitations of such data elements may improve computing resource efficiency. In an example, the first reference threshold may be a certain percentage value (e.g., 1%) of correspondence with a target feature or data element. However, aspects of the present disclosure are not limited thereto, such that the reference threshold may be a variable value, which may be set based on the number of data elements having non-negligible correspondence values or at least a minimum correspondence value.

Once the first sets of data elements are identified in operation 403, one or more additional data elements to be included in the training dataset may be further identified in operation 404. According to exemplary aspects, seemingly unique data elements may have certain commonalities within their respective data. For example, a fare basis code identifier (ID) data element may provide unique fare code ID for a ticket purchase. A fare basis code may refer to an alpha-numeric code used by individual airlines or other transportation organizations to identify a fare type and allow airline staff and travel agents to find rules applicable to the respective fare basis code. Although individual airlines may set their own fare basis codes, certain commonality or commonalities between different fare basis code IDs may be identified through parsing and searching for patterns or commonalities in the parsed data. The identified commonalities or patterns between the sub-portions of the fare basis code IDs may then be extracted and set as an additional data element to be included in the training dataset. The additionally identified data elements or variables may be combined with the first set of data elements or variables to provide a second set of data elements or a modified first set of data elements.

Moreover, in operation 404, the data elements or variables included in the first set may be further modified for improving accuracy. For example, a number of categories associated with a data element may be reduced and/or increased. Moreover, ranges may be set for numerical values associated with a data element or variable, which may further improve efficiency by reducing the number of values for consideration. According to exemplary aspects, each of the data elements or variables may include various categorical values, numerical values, binary indicators or the like.

On the other hand, if the data source origin is determined to be source type 2 in operation 402, then the method proceeds to operation 405. In operation 405, one or more third sets of data elements or variables are identified from the received sets of ticket information for evaluation. In an example, each of the third sets of data elements or variables may include different combinations of data elements or variables. According to exemplary aspects, each of the identified third sets of data elements or variables may be evaluated to determine an accuracy level that may be achieved. More detailed description of operation 405 may be provided in the description of FIGS. 7 and 8 provided below.

In operation 406, one or more of the identified first sets of data elements, the identified second sets of data elements, and the identified third sets of data elements may be trained by one or more machine learning models and evaluated for resulting accuracy levels. In an example, an accuracy level may be evaluated by training a machine learning model using at least a portion of a respective set of data corresponding to a particular set or combination of data elements, and performing a prediction on another portion of the respective set of data with the trained machine learning model. Upon performing the prediction, results of the prediction may be confirmed with target data included in the training dataset.

According to exemplary aspects, the operation 406 may include operation 406A for performing first training and evaluation, operation 406B for performing second training and evaluation, and operation 406C for performing third training and evaluation. According to exemplary aspects, the operation 406A may be applied on the identified first set of data elements or variables, the operation 406B may be applied to the identified second set of data elements or variables, and the operation 406C may be applied to the identified third set of data elements or variables. Moreover, the operations 406A, the operation 406B and the operation 406C may be performed using different machine learning model or the same machine learning model. Although three operations of training and evaluations are disclosed herein, aspects of the present disclosure are not limited thereto, such that the number of training and evaluation may be less or more than three.

Once the machine learning model or models have been trained with the identified sets of data elements and evaluated in operation 406, accuracy levels of the identified sets of data elements are compared against a reference threshold in operation 407. For example, the reference threshold may be a fixed value (e.g., 95%) or a variable value with a minimum threshold value. In an example, the reference threshold may be a value required by an organization or the highest accuracy level achieved previously by a machine learning model. For any set of data elements or variables providing an accuracy level lower than the reference threshold, the method proceeds to operation 408 and the respective set of data elements or variables are indicated as being unsuitable to serve as training data and its corresponding data are discarded in operation 408 to conserve memory storage. The specific combination of the unsuitable set or sets of data element may be stored in a list to avoid such combinations in the future. On the other hand, for the set or sets of data elements having accuracy levels above or equal to the reference threshold in operation 407, the method proceeds to operation 409.

In operation 409, a determination as to whether the number of data elements or variables are optimized or reduced is performed. In an example, if there are multiple first sets or combinations of data elements that provide accuracy levels above or equal to the reference threshold, the first set having the least amount of data elements or variables may be selected as the optimized set. The non-optimized set may proceed to operation 408, in which data corresponding to the respective non-optimized set may be discarded to save memory storage while retaining the specific combination of data elements or variables in a storage.

In contrast to conventional practice, exemplary aspects of the present disclosure are directed to lowering the number of data elements included in a training set. Although larger number of variables or data elements in certain models may provide higher accuracy, combination of large number variables or data elements may act to confuse a model due to numerous interrelations to output inconsistent or unexpected results, leading to lowered accuracies and reliability. In view of potential for such errors, it may be desirable to lessen the number of variables included in a training set for improved accuracy and consistency of output, especially in datasets including high numbers of data elements or variables. Moreover, according to exemplary aspects, the number of variables or data elements to be included in the training data may be balanced with required accuracy level of a trained model. For example, a set with the smallest number of variables or data elements may be selected over a set of a higher number of variables or data elements even if the set with the higher number of variables or data elements may provide a higher accuracy value, provided that both sets provide accuracy levels above the reference threshold in operation 407. However, aspects of the present disclosure are not limited thereto, such that if the set having the higher number of data elements or variables has an accuracy level above a certain reference amount higher (e.g., 3%) than the set with the lower number of data elements or variables, then the set having the higher number of data elements or variables may still be selected.

Once it has been determined that the identified sets of data elements or variables include optimized or least number of variables providing for requisite accuracy levels in operation 409, such sets of data elements or variables are included in the final training dataset that will be utilized to train one or more machine learning models for performing predictions on production data. According to exemplary aspects, the final training dataset may include at least a first set with an optimized number of data elements, a second set with an optimized number of data elements, and a third set with an optimized number of data elements. In addition, a machine learning model may be trained independently with each of the first set, second set and third set included in the final training dataset. Alternatively, a machine learning model may be trained in an iterative manner, such that a machine learning model may be trained with the first set, before being trained with the second set in the final training dataset.

Based on the above noted features, one or more machine learning models may be trained and/or iteratively trained using differing training sets with optimized number of data elements or variables to provide requisite predictive accuracy while reducing the number of data elements or variables considered in performing the prediction for increased consistency and predictability. More specifically, by removing the number of data elements or variables, interrelations including such data elements or variables may also be removed to reduce likelihood of obtaining obscure results based on unexpected interpretation of the interrelations. Further, the reduction in the number of data elements may increase computing efficiency (e.g., processor, memory, etc.) by reducing an amount of data to be processed. Moreover, the reduction in the number of data elements provided in a machine learning model may increase accuracy and inconsistencies by removing amount of interrelations between the data element.

FIG. 5 illustrates a method for providing a machine learning model for predicting a travel intent using agency provided data in accordance with an exemplary embodiment. FIGS. 6A-6C illustrate various processing performed on raw data of select data elements for generating a training dataset in accordance with an exemplary embodiment.

In operation 500, a set of ticketing data elements with high correlation is identified from one or more sets of agency provided data. In an example, agency provided data may include data provided by a travel agency, a corporate travel department, or the like. According to exemplary aspects, ticketing data elements may include data elements that may be provided on an issued travel ticket. For example, data elements may include, without limitation, date of purchase, date of trip, origin airport, destination airport, direct flight or connecting flight, departure date, return date, duration of trip, one-way ticket or round trip ticket, cabin class, upgrades purchased, advanced purchase information, unique ticket identifier, domestic or international flight, and the like. Moreover, the agency provided data may additionally include inherent or implicit data that may be provided based on the originating source of the data. For example, if the data is provided from a corporate travel department, it may be inherent that the type of travel for any issued ticket is for business or corporate travel, and not of leisure travel. On the other hand, if the data is provided from a travel agency specializing in vacation trips, it may be inherent that the type of travel for any issued ticket may be for leisure travel. In an example, the travel agencies utilized may include domestic (i.e., U.S.) travel agencies but are not limited thereto, such that tickets from foreign based travel agencies may also be utilized in the initial training.

In an example, the initial training data having high correspondence may include data points directed to unique ticket identifier, advance purchase information, cabin class information, departure data information, Saturday or weekend night stay information, international trip indicator, tour code, length of stay, known business or leisure (B/L) indicator, and the like. For the initial training data, only ticket or travel information including the business or leisure indicator may be selected. Based on other attributes in conjunction with the business or leisure indicators may be analyzed by the machine learning algorithm to identify certain set of patterns that may indicate that a passenger may be on a business trip or a leisure trip.

In an example, the unique ticket identifier may be utilized to identify a data record. However, the unique ticket identifier may additionally indicate additional information that may be embedded by a travel agency or an airline (e.g., whether the ticket was purchased using airline or credit card points), which may provide additional information. The advance purchase information may indicate a number of days, weeks, or months that the tickets may be purchased prior the travel date. The cabin class may indicate a level of service selected by the passenger. The level of service may include first class, business class, economy class, economy class plus, additional upgrades selected (e.g., seat or row selection), and the like. However, aspects of the present disclosure are not limited thereto, such that the level of service may additionally include additional services purchased, such as additional baggage, food service, entertainment service, gifts purchased and the like as well as the payment tender utilized for such services (e.g., corporate or personal credit card). The departure date may indicate a day of week selected for travel. However, aspects of the present disclosure are not limited thereto, such that departure time may also be considered in training of the trip classification indicator model. The Saturday night stay may be a binary indicator, such as yes or no. The tour code may refer to a special code arranged between a travel agency and an airline. In an example, the tour code may indicate a discount or a special negotiated fare that the travel agency is given by the respective airline. The length of stay may indicate a duration of time (e.g., days) before the scheduled return trip. The known business or leisure indicator may be a binary indicator that indicates a known purpose of trip (i.e., business or leisure). However, aspects of the present disclosure are not limited thereto, such that the business or leisure indicator may additionally indicate special purpose of trip (e.g., family vacation, anniversary trip or the like).

In operation 501, data of one or more data elements may be parsed for pattern analysis of the parsed data for identification of certain correlations. According to exemplary aspects, seemingly unique data elements may have certain commonalities within their data. The sub-portions or the parsed portions of data of the data element having correlation with other data elements may be identified and categorized as a separate data element. Accordingly, even if data of a data element may not indicate significant correspondence with data of other data elements, parsed portions of such data may have significant correspondence with data of other data elements. In such a scenario, the sub-portions or the parsed data may be set as an independent data element to potentially be included in the training data.

In operation 502, data for the identified data elements are extracted for generating a training dataset. According to exemplary aspects, the initial training data may be provided as SQL data, which may be pre-processed prior to its application. In an example, pre-processing of training SQL data may include initial extraction from a datastore, datamart or a data server storing raw travel data, and filtering thereof.

In operation 503, label encoding is built to convert categorical variables to numerical values. According to exemplary aspects, pre-processing may additionally include categorization of raw data and conversion to numerical values.

For example, cabin class may be an alpha code that may be categorized into a numerical category as illustrated in FIG. 6A As illustrated in FIG. 6A, cabin class of 'A0' may be converted into a numerical value of '1'. Similarly, cabin classes of 'C', 'DY', 'F', 'J', 'R', 'W' and 'Y' may be converted into a numerical values of 2', '3', '4', '5', '6', '7' and '8', respectively. Although 8 categories or groups of cabin classes are described herein, aspects of the present disclosure are not limited thereto, such that a smaller or larger number of cabin classes may be utilized for better correlations.

One or more of the other field values (i.e., Advance purchase information, Cabin class, Departure date, Saturday night stay, international trip indicator, Tour code, Length of stay, and known B/L indicator) may also be converted into numerical values, as applicable.

After conversion of raw data into various numerical conversions, input data values may be provided as exemplarily illustrated in FIG. 6B. For example, a ticket identifier of '1915500000000016263' may have a numerical value of '3' for the Advance purchase information (ADV), a numerical value of '8' for the Cabin class (C), a numerical value of '1' for the Departure date (D), a numerical value of '0' for the Saturday night stay(S), a numerical value of '1' for the international trip indicator (I), a numerical value of '0' for the Tour code (T), and a numerical value of '3' for the Length of stay (LOS).

Once the numerical conversions of raw data is performed, the converted data may then separate feature data from target data. As exemplarily illustrated in FIG. 6C, the target data may include data corresponding to the B/L indicator. In an example, a numerical value of '0' may indicate a leisure type travel, whereas a numerical value of '1' may indicate a business type travel. The feature data may include data corresponding to Advance purchase information (ADV), Cabin class (C), Departure date (D), Saturday night stay(S), International trip indicator (I), Tour code (T), and Length of stay (LOS).

In operation 504, hyperparameter tuning is performed to find an optimal feature or features out of the identified set of data elements for generating a training dataset. In an example, hyperparameter may refer to a parameter that is utilized to control the learning process. According to exemplary aspects, hyperparameter tuning may refer to a search for an ideal model architecture for a machine learning model. Hyperparameter tuning may include attempting differing combinations of parameters for evaluation and comparison, and may identify a set of parameters that may be highly corresponding to one another. According to exemplary aspects, a parameter having a correspondence level above a reference value may be selected. Moreover, hyperparameter tuning may be performed to reduce the number of data elements or variables while retaining requisite accuracy level for the machine learning model. Hyperparameter tuning may include a number of approaches that may be implemented in search for option feature of features. For example, hyperparameter tuning may be performed using a grid search, random search, gradient-based optimization, evolutionary optimization, population-based, Bayesian optimization, early stopping-based and the like.

In operation 505, a machine learning algorithm, such as a decision tree or a combination of outputs of trees created from random forests, is developed and applied to the training dataset. In an example, application of the machine learning algorithm may include iterative training operations along with confirmation operations. For example, initial training may be performed with a first training set including the initial set of input data, which may be followed up with a second training set, which may include the first training set and combination of data included in the data elements that were incorrectly detected after the initial training.

According to exemplary aspects, the numerically converted input data may be split into a training set and a validation set. For example, 70% of the numerically converted input data may be allocated as the training set and 30% of the numerically converted input data may be allocated as the validation set. However, aspects of the present disclosure are not limited thereto, such that percentage allocation may be modified. The training set may be utilized for performing the initial training of a machine learning model, and the validation set may be utilized for performing accuracy validation. The machine learning model may be adjusted or retrained based on the accuracy validation.

According to exemplary embodiments, machine learning algorithms may perform pattern recognition, and may include supervised learning algorithms such as, for example, k-medoids analysis, regression analysis, decision tree analysis, random forest analysis, k-nearest neighbors analysis, logistic regression analysis, N-fold cross-validation analysis, balanced class weight analysis, a In another exemplary embodiment, machine learning analytical techniques may include unsupervised learning algorithms such as, for example, Apriori analysis, K-means clustering analysis, isolation forest analysis, and the like. In another exemplary embodiment, machine learning analytical techniques may include reinforcement learning algorithms such as, for example, Markov Decision Process analysis, and the like.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In operation 506, X and Y classification output of training dataset are stored in a memory storage. The training dataset may include feature data and target data. As exemplarily illustrated in FIG. 6C, feature data may include data corresponding to data elements of Advance purchase information (ADV), Cabin class (C), Departure date (D), Saturday night stay(S), International trip indicator (I), Tour code (T), and Length of stay (LOS). Target data may include data corresponding to a data element of business/leisure (B/L) indicator.

Once the model is trained, the trained model may be evaluated by passing the evaluation data into the trained model for performing a prediction. Once the prediction is performed for generating and outputting of predicted data, the predicted data is then compared with actual values for determining of accuracy of the trained model. The trained model may be modified or retrained after each iteration using additional evaluation data until a target accuracy level (e.g., 96% or greater) is achieved.

The machine learning model that reaches the target accuracy level may then be utilized for performing prediction on input data (e.g., ticket attributes for a ticketed trip) for which target data (e.g., business or leisure travel) may be unknown. Alternatively, the machine learning model may be saved for later use. In an example, the machine learning model may be saved locally and/or onto a cloud storage service.

Once the machine learning model is satisfactorily trained to provide for required consistency and accuracy, a user defined function (UDF) may be generated on a production network to perform prediction on new ticket data received from various sources in operation 507.

In operation 508, the user defined function is executed to apply the trained machine learning model to the newly received ticketing data to generate classification output. More specifically, once the satisfactorily trained machine learning model is saved onto the cloud storage service, the user defined function may be executed to input the new ticket attribute data into the trained machine learning model for outputting whether a respective ticketed travel is a business trip or a leisure trip. For example, the new ticket attribute data may be inputted to the machine learning model via the user defined function on a cloud network. The outputted prediction, such as a prediction as to whether a ticketed trip is a business trip or a leisure trip, may then be saved in a separate table in a cloud storage.

FIG. 7 illustrates a method for providing a machine learning model for predicting a travel intent using direct booking data in accordance with an exemplary embodiment.

In operation 701, direct ticketing and/or non-agency information are obtained. Unlike agency provided data, direct ticketing information may include different data elements as well as same data elements. For example, direct ticketing information may lack any information indicating whether a traveler is a business traveler or a leisure traveler as both corporate travelers and leisure travelers may book their trips. On the other hand, direct ticketing information may share one or more similar data elements with the agency provided data.

According to exemplary aspects, direct ticketing information may include ticket purchase information associated with tickets booked directly from various airlines. Alternatively, direct ticketing information may refer to non-agency ticketing information. Although the present disclosure is provided with respect to air travel, aspects of the present disclosure are not limited thereto, such that it may be relevant to rail travel, water travel, road travel and the like.

In operation 702, new ticketing data elements or variables are identified from the direct ticketing information based on application of a set of rules or determined correlations. More specifically, at least since the data elements included in the direct ticketing information may be different from those that are included in the agency provided data, different sets of data elements may be provided. In an example, newly identified data elements include, without limitation, originating and destination airports (OND_ARPTS), carrier (CARR), global distribution system (GDS), Agent number (AGTN), trip type (e.g., whether the trip is round trip or one way) and the like. Based on the above, data elements for direct ticketing information may include, without limitation, unique ticket identifier, carrier, originating and destination airports, advance purchase information, cabin class, departure date, Saturday stay, international or domestic flight, tour code, length of stay, fare basis code ID, global distribution system, agent number, trip type, and a business trip or a leisure trip indicator.

In operation 703, data for the identified data elements are extracted for generating a training dataset. According to exemplary aspects, the initial training data may be provided as SQL data, which may be pre-processed prior to its application. In an example, pre-processing of training SQL data may include initial extraction from a datastore or datamart storing raw travel data, and filtering thereof.

In operation 704, label encoding is built to convert categorical variables to numerical values. According to exemplary aspects, pre-processing may additionally include categorization of raw data and conversion to numerical values. In an example, label encoding may be performed similar to operation 503, with similar or differing data elements and categorical values.

In operation 705, a smart label encoding table is generated and stored on a cloud network. An exemplary smart label encoding table is illustrated in FIG. 8. As illustrated in FIG. 8, each of the data elements is vertically listed, and each of the same data elements is horizontally listed. As illustrated in FIG. 8, data elements may include ticket identifier (TKT_ID), carrier (CARR), originating and destination airports (OND_ARPTS), advance purchase information (ADV), cabin class (CLS), departure date (DEPT_DAY), Saturday night stay (SAT_STAY), international trip indicator (INT_IND), tour code (TOUR_CD), length of stay (LOS), fare basis code ID (FARE_CID), global distribution system (GDS), Agent number (AGTN), trip type (TRP_TYPE_CD), and business or leisure indicator (BL_IND).

In each intersection between two data elements, correspondence may be indicated with a value of 0 indicating no correspondence, and a value of 1.0 indicating a perfect correspondence. For each value of correspondence, different color or shade may be presented for improve visual efficiency. More specifically, by providing a differing shade or color for each intersecting value, a user may more quickly identify corresponding data elements or features.

According to exemplary aspects, a smart label encoding table may be referred to as the originating and destination airports table. According to exemplary aspects, every unique destination may create a unique reference number. The machine learning model may then be trained on the unique reference number. The machine learning model may not be executed for any destination in the origination and destination data element that does not match with a unique reference number corresponding to a stored destination.

In operation 706, a machine learning algorithm is developed and applied to the training dataset. According to exemplary aspects, the machine learning algorithm may sequentially create multiple trees via a random forest Each of the multiple tree may then provide an output, and the outputs of those trees are then combined to obtain a single result. According to further aspects, each subsequent tree may learn from the previous tree in iteration.

According to exemplary aspects, the numerically converted input data may be split into a training set and a validation set. For example, 70% of the numerically converted input data may be allocated as the training set and 30% of the numerically converted input data may be allocated as the validation set. However, aspects of the present disclosure are not limited thereto, such that percentage allocation may be modified. The training set may be utilized for performing the initial training of a machine learning model, and the validation set may be utilized for performing accuracy validation. The machine learning model may be adjusted based on the accuracy validation.

In operation 707, hyperparameter tuning is performed to find an optimal feature or features out of the identified set of data elements for generating a training dataset. In an example, hyperparameter may refer to a parameter that is utilized to control the learning process. According to exemplary aspects, hyperparameter tuning may refer to a search for an ideal model architecture for a machine learning model. Hyperparameter tuning may include attempting differing combinations of parameters for evaluation and comparison, and may identify a set of parameters that may be highly corresponding to one another. According to exemplary aspects, a parameter having a correspondence level above a reference value may be selected. Moreover, hyperparameter tuning may be performed to reduce the number of data elements or variables while retaining requisite accuracy level for the machine learning model. Hyperparameter tuning may include a number of approaches that may be implemented in search for option feature of features. For example, hyperparameter tuning may be performed using a grid search, random search, gradient-based optimization, evolutionary optimization, population-based, Bayesian optimization, early stopping-based and the like.

In operation 708, X and Y classification output of training dataset are stored in a memory storage. The training dataset may include feature data and target data.

Once the model is trained, the trained model may be evaluated by passing the evaluation data into the trained model for performing a prediction. Once the prediction is performed for generating and outputting of predicted data, the predicted data is then compared with actual values for determining of accuracy of the trained model. The trained model may be modified after each iteration using additional evaluation data until a target accuracy level (e.g., 96% or greater) is achieved.

The machine learning model that reaches the target accuracy level may then be utilized for performing prediction on input data (e.g., ticket attributes for a ticketed trip) for which target data (e.g., business or leisure travel) may be unknown. Alternatively, the machine learning model may be saved for later use. In an example, the machine learning model may be saved locally and/or onto a cloud storage service.

Once the machine learning model is satisfactorily trained to provide for required consistency and accuracy, a user defined function (UDF) may be generated on a production network to perform prediction on new direct ticketing and/or non-agency data operation 709.

In operation 710, the user defined function is executed to obtain output for the new direct ticketing and/or non-agency data and combined with output for the agency data, which may be provided by another machine learning model.

In operation 711, the user defined function is executed to apply the trained machine learning model to the newly received ticketing data to generate combined classification output. More specifically, once the satisfactorily trained machine learning model is saved onto the cloud storage service, the user defined function may be executed to input the new ticket attribute data into the trained machine learning model or models for outputting whether a respective ticketed travel is a business trip or a leisure trip. For example, the new ticket attribute data may be inputted to the machine learning model via the user defined function on a cloud network. The outputted prediction, such as a prediction as to whether a ticketed trip is a business trip or a leisure trip, may then be saved in a separate table in a cloud storage.

Figure 9:
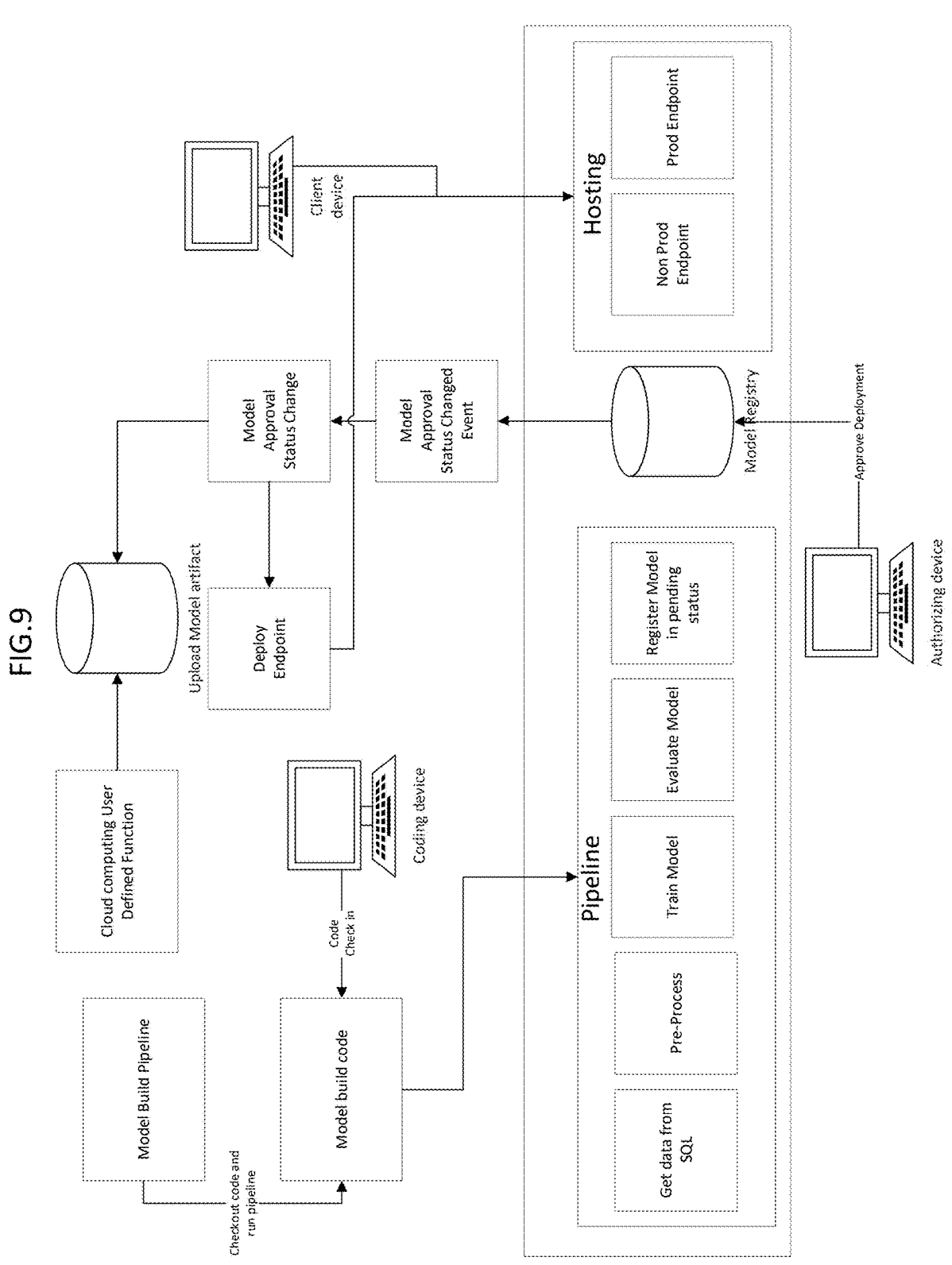
FIG. 9 illustrates a system for generating a machine learning model trained with optimized sets of training data in accordance with an exemplary embodiment.

FIG. 9 illustrates a system for generating a machine learning model trained with optimized sets of training data in accordance with an exemplary embodiment.

As illustrated in FIG. 9, a machine learning algorithm or code may be initially checked in by a coding device for building of a corresponding machine learning model. Once the machine learning algorithm or code is checked in, a model build pipeline operation may be initiated. The model build pipeline operation may checkout the machine learning algorithm or code and the model build pipeline is then executed.

The model build pipeline includes (i) getting data from a data source or SQL, (ii) performing one or more pre-processes on the obtained data, (iii) iterative training of the machined learning model, (iv) evaluating of the trained machined learning model, and (v) upon achieving requisite accuracy level with optimized number of data elements or variables, registering the respective machine learning model in pending status.

Once the authorizing device approves deployment of the registered machine learning model, model approval status changed event is transmitted to a cloud network. In response to the received model approval status changed event, the machine learning model approval status is changed from pending to approved. In response to the approval change status, the machine learning model is then sent to the deployment endpoint and, in parallel, uploaded to a cloud storage for access and execution by a cloud computing user defined function.

The deploy endpoint deploys the approved machine learning model to the non-production endpoint or environment for further testing and improvement of the approved machine learning model, and also for production endpoint for performing predictions on production data. According to exemplary aspects, the predictions may be performed on the production data automatically or in response to an input provided by the client device.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:
1. A method for performing a prediction of a travel intent of a trip, the method comprising:

receiving, by a processor, a plurality of sets of ticket attribute information from a plurality of sources, the plurality of sources including at least one first source type and at least one second source type;

determining, by the processor, whether the ticket attribute information is received from the at least one first source type or the at least one second source type;

in response to determining that a first set of ticket attribute information is included among the plurality of sets of ticket attribute information based on the determined source type, identifying a first set of data elements included in the first set of ticket attribute information for training a first machine learning model;

in response to determining that a second set of ticket attribute information is included among the plurality of sets of ticket attribute information based on the determined source type, identifying a second set of data elements included in the first set of ticket attribute information for training a second machine learning model;

parsing at least one data element included in the first set of ticket attribute information, wherein the at least one data element is absent from the first set of data elements, identifying a pattern comprising correlations and commonalities among a select portion of the parsed at least one data element by analyzing correspondence levels between data element sub-portions, and setting the select portion of the parsed at least one data element as an independent data element to be added to the first set of data elements to provide a modified first set of data elements;

extracting, by the processor and from a server, data corresponding to the modified first set of data elements and the second set of data elements;

performing, by the processor, hyper parameter tuning to reduce a number of data elements to be included in a training dataset among each of the modified first set of data elements and the second set of data elements;

iteratively training, by the processor, at least one of the first machine learning model and second machine learning model to the training dataset and evaluating accuracy of output provided by the trained at least one of the first machine learning model and second machine learning model with respect to a reference threshold;

generating, by the processor and on a cloud network, a user defined function for processing a new set of ticket attribute information through the trained at least one of the first machine learning model and second machine learning model; and executing, by the processor, the user defined function to apply the trained at least one of the first machine learning model and second machine learning model on the new set of ticket attribute information and providing a prediction of whether each trip included in the new set of ticket attribute information is a business type or a leisure type.

2. The method according to claim 1, wherein the second set of data elements includes one or more data elements absent in the first set of ticket attribute information.

3. The method according to claim 1, wherein at least one data element of the modified first set of data elements and the second set of data elements includes a plurality of categorical values.

4. The method according to claim 1, wherein at least one data element of the modified first set of data elements and the second set of data elements includes a binary indicator.

5. The method according to claim 1, wherein at least one data element of the modified first set of data elements and the second set of data elements includes a discrete numerical value.

6. The method according to claim 1, further comprising:
building, by the processor, label encoding to convert categorical variables of a data element to numeric values.

7. The method according to claim 1, wherein a number of data elements included in the training dataset is less than a number of data elements included in the modified first set of data elements and the second set of data elements.

8. The method according to claim 1, wherein at least one of the first machine learning model and the second machine learning model is a decision tree.

9. The method according to claim 1, wherein at least one of the first machine learning model and the second machine learning model is a random forest that successively generates a plurality of trees.

10. The method according to claim 9, wherein outputs of the plurality of trees are combined to provide a single result.

11. The method according to claim 1, wherein each of the data elements included in the training set has a correspondence level above a reference value with respect to a target output.

12. The method according to claim 1, further comprising:
modifying at least one attribute of a data element included in the training dataset.

13. The method according to claim 12, wherein the modifying the at least one attribute of the data element includes modifying a number of categories corresponding to the data element included in the training dataset.

14. The method according to claim 12, wherein the modifying the at least one attribute of the data element includes modifying discrete values to a set of ranges.

15. The method according to claim 1, wherein the plurality of sets of ticket attribute information includes a set of agency provided data and a set of direct ticketing data.

16. The method according to claim 1, wherein the hyper parameter tuning selects smallest number of data elements that provides an accuracy level that is greater than or equal to the reference threshold.

17. The method according to claim 1, further comprising generating a label encoding table corresponding to the second set of data elements.

18. The method according to claim 1, wherein the reference threshold is a fixed value or a variable value that corresponds to highest accuracy level achieved by a previous machine learning model.

19. A system for performing a prediction of a travel intent of a trip, the system comprising:
a memory; and
a processor,
wherein the system is configured to perform:
receiving a plurality of sets of ticket attribute information from a plurality of sources, the plurality of sources including at least one first source type and at least one second source type;
determining whether the ticket attribute information is received from the at least one first source type or the at least one second source type;
in response to determining that a first set of ticket attribute information is included among the plurality of sets of ticket attribute information based on the determined source type, identifying a first set of data elements included in the first set of ticket attribute information for training a first machine learning model;

28 in response to determining that a second set of ticket attribute information is included among the plurality of sets of ticket attribute information based on the determined source type, identifying a second set of data elements included in the first set of ticket attribute information for training a second machine learning model;
parsing at least one data element included in the first set of ticket attribute information, wherein the at least one data element is absent from the first set of data elements, identifying a pattern comprising correlations and commonalities among a select portion of the parsed at least one data element by analyzing correspondence levels between data element sub-portions, and setting the select portion of the parsed at least one data element as an independent data element to be added to the first set of data elements to provide a modified first set of data elements;
extracting, from a server, data corresponding to the modified first set of data elements and the second set of data elements;
performing hyper parameter tuning to reduce a number of data elements to be included in a training dataset among each of the modified first set of data elements and the second set of data elements;
iteratively training at least one of the first machine learning model and second machine learning model to the training dataset and evaluating accuracy of output provided by the trained at least one of the first machine learning model and second machine learning model with respect to a reference threshold;
generating, on a cloud network, a user defined function for processing a new set of ticket attribute information through the trained at least one of the first machine learning model and second machine learning model; and
executing the user defined function to apply the trained at least one of the first machine learning model and second machine learning model on the new set of ticket attribute information and providing a prediction of whether each trip included in the new set of ticket attribute information is a business type or a leisure type.

20. A non-transitory computer readable storage medium that stores a computer program for performing a prediction of a travel intent of a trip, the computer program, when executed by a processor, causing a system to perform a plurality of processes comprising:
receiving a plurality of sets of ticket attribute information from a plurality of sources, the plurality of sources including at least one first source type and at least one second source type;
determining whether the ticket attribute information is received from the at least one first source type or the at least one second source type;
in response to determining that a first set of ticket attribute information is included among the plurality of sets of ticket attribute information based on the determined source type, identifying a first set of data elements included in the first set of ticket attribute information for training a first machine learning model;
in response to determining that a second set of ticket attribute information is included among the plurality of sets of ticket attribute information based on the determined source type, identifying a second set of data elements included in the first set of ticket attribute information for training a second machine learning model;

parsing at least one data element included in the first set of ticket attribute information, wherein the at least one data element is absent from the first set of data elements, identifying a pattern comprising correlations and commonalities among a select portion of the parsed at least one data element by analyzing correspondence levels between data element sub-portions, and setting the select portion of the parsed at least one data element as an independent data element to be added to the first set of data elements to provide a modified first set of data elements;

extracting, from a server, data corresponding to the modified first set of data elements and the second set of data elements;

performing hyper parameter tuning to reduce a number of data elements to be included in a training dataset among each of the modified first set of data elements and the second set of data elements;

iteratively training at least one of the first machine learning model and second machine learning model to the training dataset and evaluating accuracy of output provided by the trained at least one of the first machine learning model and second machine learning model with respect to a reference threshold;

generating, on a cloud network, a user defined function for processing a new set of ticket attribute information through the trained at least one of the first machine learning model and second machine learning model; and executing the user defined function to apply the trained at least one of the first machine learning model and second machine learning model on the new set of ticket attribute information and providing a prediction of whether each trip included in the new set of ticket attribute information is a business type or a leisure type.

* * * * *